ent Number: 5,347,361
Date of Patent: Sep. 13, 1994

[54] ROTATION SENSOR OUTPUT SIGNAL PROCESSOR

[75] Inventor: Robert M. Kay, Seminole, Fla.

[73] Assignee: Honeywell Inc., Minneapolis, Minn.

[21] Appl. No.: 865,128

[22] Filed: Apr. 8, 1992

[51] Int. Cl.$^5$ .............................................. G01C 19/64
[52] U.S. Cl. ........................................ 356/350; 372/94
[58] Field of Search ......................... 356/350; 372/94

[56] References Cited

U.S. PATENT DOCUMENTS

| | | | |
|---|---|---|---|
| 3,373,650 | 3/1968 | Killpatrick | 88/14 |
| 3,627,425 | 12/1971 | Doyle et al. | 356/106 |
| 4,248,534 | 2/1981 | Elbert | 356/350 |
| 4,344,706 | 8/1982 | Ljung et al. | 356/350 |
| 4,411,527 | 10/1983 | Gamertsfelder et al. | 356/350 |
| 4,445,779 | 5/1984 | Johnson | 356/350 |
| 4,597,667 | 7/1986 | Curby et al. | 356/350 |
| 4,610,543 | 9/1986 | Ferriss | 356/350 |
| 4,790,658 | 12/1988 | Sewell | 356/350 |
| 4,802,766 | 2/1989 | Lundeen et al. | 356/350 |
| 4,826,320 | 5/1989 | Callaghan et al. | 356/350 |
| 5,189,487 | 2/1993 | Mark et al. | 356/350 |

OTHER PUBLICATIONS

"Demonstration of a Ring Laser Gyro System for Pointing and Stabilization Applications," R. Majure, IEEE Plans '90-Position Location and Navigation Symposium, Las Vegas, Nev., Mar. 20-23, 1990.
Entry on "Phase-Locked Loop Circuits," Electronics Engineers' Handbook, Third Ed., Chapter 8, pp. 8-66, Published by McGraw-Hill Book Company.
"Angle Demodulators," N. R. Powell, Electronics Engineers' Handbook, Third Ed. pp. 14-20 to 14-25, published by McGraw-Hill Book Company.

Primary Examiner—Davis L. Willis
Assistant Examiner—LaCharles P. Keesee
Attorney, Agent, or Firm—Robert A. Pajak

[57] ABSTRACT

Angular motion sensor signals from an inertial integrating rate sensor are provided to a translation device that provides a translated output signal that is substantially the same as an input sensor signal translated in frequency by an amount equal to a reference frequency. The translated output signal is provided to a phase detector that provides a detector output signal indicative of phase differences between the translated output signal and a feedback signal. The phase detector output signal is provided to a voltage controlled oscillator which provides an oscillator output signal that is related to the phase detector output signal. The voltage controlled oscillator signal is provided to a counter that is capable of providing a count that is representative of a highly resolved measure of angular rotation. In addition, the counter is capable of providing the feedback signal that is related to the variable frequency output signal.

20 Claims, 1 Drawing Sheet

ROTATION SENSOR OUTPUT SIGNAL PROCESSOR

BACKGROUND OF THE INVENTION

The present invention relates to angular rate sensors and, more particularly, to apparatus and techniques for providing high resolution output signals representative of increments of angular velocity and/or increments of angular rotation.

Ring laser gyroscopes or inertial integrating rate sensors are generally known, one of which is described in U.S. Pat. No. 3,373,650 to J. E. Killpatrick and assigned to the assignee of the present invention, and hereby incorporated herein by reference. The ring laser gyroscope described in this patent makes use of two quasi-monochromatic beams of light that are generated in two opposite directions around a closed loop path about an axis of rotation in an optical resonator. Rotation about the axis causes the effective path lengths for the two beams to change, thus producing a frequency difference between the two beams since the frequency of oscillation of a laser is dependent upon the length of the lasing path.

The frequency difference between the two beams causes a phase shift between these beams which changes at a rate proportional to the rate of change of angular rotation; thus, the accumulated phase shift over time between the two beams is proportional to the integral of the rate of angular rotation. In other words, the integrated rate sensor output is representative of the integral of the input angular rate.

The phase difference between the two quasi-monochromatic beams is typically determined using a beam combiner. The beam combiner produces an interference or fringe pattern which impinges upon a pair of photodetectors. The fringe pattern represents the beat frequency of the heterodyned optical frequencies of the quasi-monochromatic beams. This fringe pattern consists of a pattern of alternate light and dark bands of light which move to the left or right depending on the direction of rotation of the gyro or angular rate sensor. If these two detectors are positioned one-quarter wavelength apart, then two sine waves 90° out of phase are obtained and their relative phase lead or lag is an indication of the direction in which the laser gyroscope is rotating, such as shown in U.S. Pat. No. 3,627,425 issued to B. Doyle and assigned to the assignee of the present invention and incorporated herein by reference.

However, at low rotation rates when the difference in frequency between the two beams is small, the two beams tend to resonate together or "lock-in" so that the two beams oscillate at only one frequency. Thus, measuring low rotation rates with the gyroscope becomes impossible because expected frequency differences between the beams, proportional to the rotation rates, do not exist at these low rates.

To avoid or reduce the effects of lock-in, laser angular rate sensors may be biased as described in U.S. Pat. No. 3,373,650. This biasing technique, usually referred to as "dithering", much reduces the lock-in problem by operating the laser angular rate sensor in a manner such that it is not required to measure low input rates directly. That is, the resonator is electrically or mechanically oscillated with respect to a base so that the resonator seems to be rotating at a rate higher than the lock-in rate for a majority of the time. The times when the resonator is below the lock-in rate, at the extremities of the oscillation, are only very small fractions of the dither oscillation period and, consequently, have a relatively small effect on the operation of the sensor.

There are, however, some disadvantages to the use of biasing techniques to eliminate the effects of lock-in. As a result of either mechanical or electrical biasing, larger path length differences for the oppositely rotating beams are achieved most of the time to thereby produce a resultant frequency difference to much reduce the problem of lock-in. However, this added frequency difference is recorded by each of the photodetectors thereby adding a dither component to the integrating rate sensor output.

Each of the photodetectors provides an output signal representative of the light and dark bands produced by the interference pattern that impinges on these photodetectors. The output of each of the photodetectors is a sinusoidal signal having a frequency that represents the rate of fringe pattern movement past each photodetector. The photodetector output frequency, or rate of fringe pattern movement, is proportional to the rate of angular rotation of the sensor. Frequently, the photodetector output is provided to a zero-crossing detector that converts the photodetector output to a series of discrete pulses. These pulses can be counted in a known manner and count totals thereof are sampled by a signal processing system to determine the angular rotation rate of the sensor. The ratio of the number of discrete pulses or counts generated by a photodetector relative to the amount of rotation of the sensor is called the "scale factor." This scale factor is fixed in part by the size of the ring laser gyro or, more precisely, by the size of the closed optical path or resonant cavity, i.e. the optical resonator, which is oscillated. In addition to the size of the resonant cavity, the lasing wavelength also affects the interference pattern and therefore the scale factor of the sensor. Therefore, the resolution of an angular rate sensor output signal is limited by the resonant cavity size and the lasing wavelength in relation to the noise sources present in the gyroscope.

Inertial navigation systems usually make use of three or more inertial integrating rate sensors. These sensors usually have an orientation such that the axes of sensitivity of the inertial integrating rate sensors are substantially mutually orthogonal to one another thereby forming a basis for a corresponding coordinate system.

Frequently, an accurate determination of the attitude of such an inertial navigation system coordinate frame with respect to an earth-bound frame, or coordinate system, is needed. The attitude of the inertial navigation system at any instant in time can be determined using a digital computer in a known manner based on an initial attitude and the instantaneous angular rotations the inertial navigation system has undergone. Thus, improving the resolution of each of the inertial integrating rate sensors that are used with the navigation system improves the accuracy of the attitude angle that is computed therefrom.

Aside from inertial navigation systems, there are other applications where the integrating rate sensor that is used must provide very accurate rotational information. In these applications, sometimes only one or two integrating rate sensors are mounted to an object as a means for providing angular rotation information to a system. For example, inertial integrating rate sensors may be used to provide rotational information for an optical telescope having just one or two axes of rotation. This rotational information is provided to a control system that is capable of selectively activating servo motors to reposition the telescope, thus insuring the telescope remains pointed at a selected target.

There is a present need for a high resolution or high accuracy signal that represents either increments of angular rotation or increments of angular velocity of the sensor. Moreover, this system should be easy to implement, make use of low cost components and have high reliability. In addition, the sensor output signal produced by dithered or rotationally oscillated angular rate sensors contains a signal component that is directly related to biasing the sensor. This signal component in the sensor output signal due to the biasing is herein referred to as the dither signal component. This dither signal component represents an instantaneous error in the sensor output insofar as that signal represents the undithered angular motion of the resonator. Therefore, in many applications requiring high accuracy or high resolution, the need also exists to minimize or remove this dither signal component in the sensor output signal.

SUMMARY OF THE INVENTION

The present invention is an angular rotation sensing system which includes an angular motion sensor for providing an angular motion sensor output signal. This angular motion sensor output signal has an inertial component due to any system rotation input angle and an oscillation component due to an imposed rotational oscillation of the angular motion sensor sensed by the angular motion sensor.

A mixer means is provided for receiving a mixer input signal based on the sensor output signal that is representative of both the inertial and oscillation components therein and of a reference signal. The mixer means provides a mixer means output signal that is representative of the mixer means input signal modulated with the reference signal.

A synchronous oscillator means has a signal related to the mixer means output signal pulse therein. The synchronous oscillator provides the system output signal based on the signal related to the mixer means output signal phase.

DETAILED DESCRIPTION OF THE PREFERRED EMBODIMENTS

Figure 1:
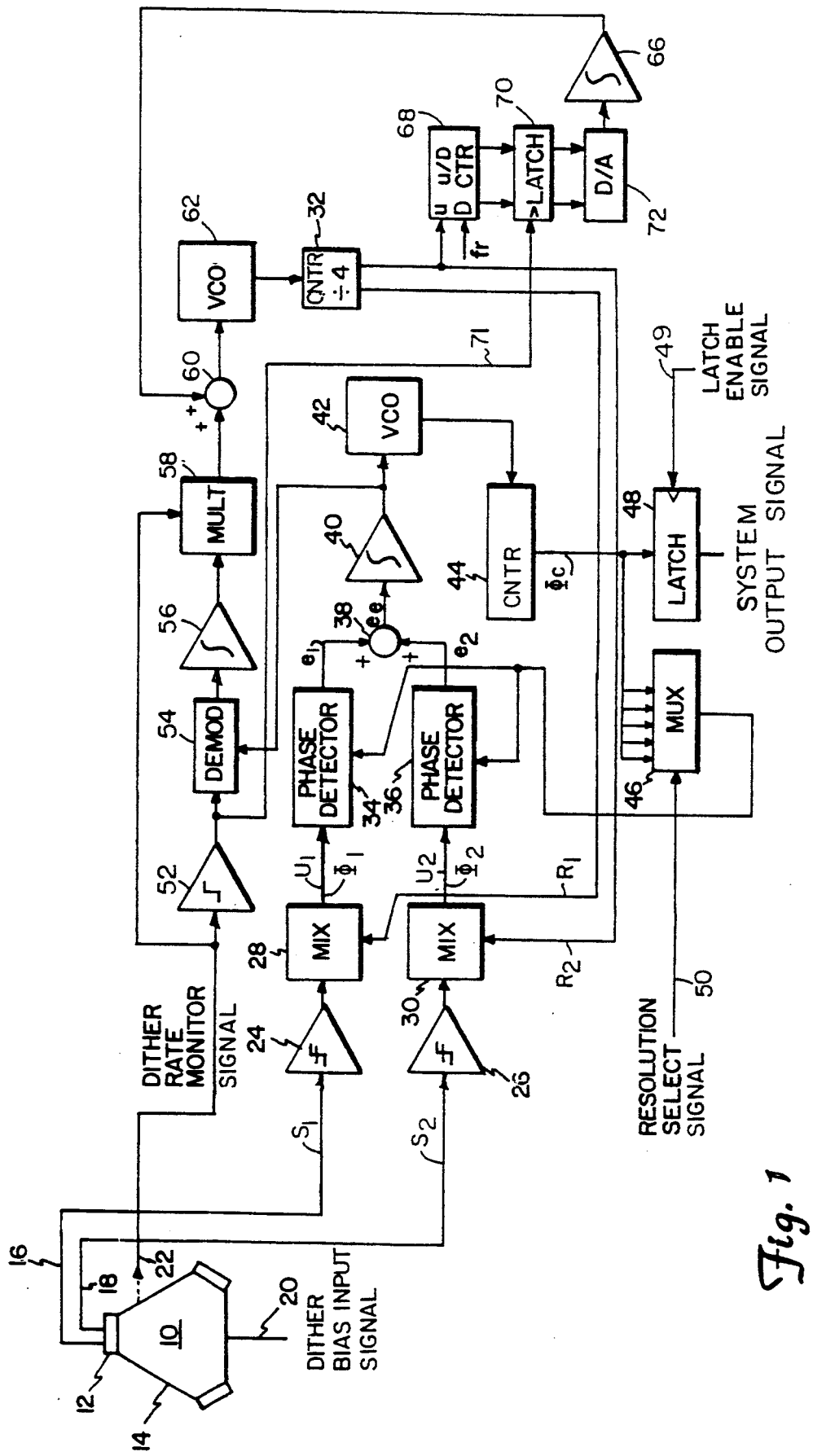
FIG. 1 is a system block diagram illustrating a scheme for providing a system output signal without a component based on the dither signal component of the sensor output signal.

FIG. 1 shows a block diagram of a system embodying the sensor output signal processing and dither signal component removing system of the present invention. In that diagram, a sensor, 10, is the source of those signals that are operated on by the present invention to produce a system output signal. Sensor 10 includes a detection mechanism, 12, mounted to a block, 14. Block 14 provides a closed loop optical path, or optical resonator, in which two quasi-monochromatic laser beams are generated in opposite directions. An angular movement of sensor 10 in either direction about a central axis causes the effective path lengths for the two beams to change. Because the closed optical path is a resonant cavity capable of sustaining oscillation, the wavelength of each beam will also increase or decrease accordingly. Angular rotation, therefore, causes a frequency differential to occur between the two beam frequencies that is proportional to the rate of angular rotation.

The two beams, one traveling clockwise and the other traveling counterclockwise within block 14, are heterodyned in the detection mechanism 12 to produce an interference pattern. This interference pattern is detected by a photodetection means which senses the beat frequency of the heterodyned optical frequencies of the two beams. The detection means includes two photodetectors, each photodetector being capable of providing one of photodetector output signals, 16 and 18. These photodetector output signals 16 and 18 are substantially sinusoidal signals that are representative of light and dark bands of the interference pattern produced when the clockwise and counterclockwise light beams are combined in detection mechanism 12. Each photodetector is positioned within detection mechanism 12 a quarter wavelength apart so that the photodetector output signals 16 and 18 are sinusoidal signals 90° out of phase from each other. When sensor 10 rotates in one direction, one sensor output will lead the other by 90°. Conversely, when sensor 10 is rotated in the opposite direction, the other sensor output will lead by 90°.

Sensor 10 is provided with a dither bias input or drive signal, 20, for providing a dither bias. This dither bias increases the frequency difference between the two beams most of the time, thus making it possible to determine the frequency difference at low rotation rates. This dither bias can be applied either electrically or mechanically in dithered systems. In a mechanically dithered system the dither input signal 20 produces sinusoidal rotational oscillation of sensor 10. For example, block 14 may be rotationally oscillated for dithering purposes, as described in U.S. Pat. No. 3,373,650. A dither spring having piezoelectric motion inducing devices attached thereto causes the spring to periodically flex resulting in block 14 rotationally oscillating. Furthermore, a piezoelectric motion sensing device may also be attached to the spring for providing a dither rate monitor signal, 22, that is directly related to the relative motion between the sensor block 14 and a base (not shown) to which sensor 10 is mounted.

The mechanical biasing or rotational oscillation of sensor 10 results in a rotational motion that directly affects the number and rate of fringe changes passing the photodetectors, and so directly affects output signals 16 and 18. Output signals 16 and 18, therefore, include both a dither induced signal component and an inertial rotation induced signal component.

The photodetector output signals 16 and 18 provided by the detector mechanism 12 are herein designated as "$s_1$" and "$s_2$", respectively. The substantially sinusoidal signal $s_1$ can be represented for modeling purposes by the following equation:

Equation No. 1:

$$S_1 = \cos 2\pi (f_i + f_d)t$$

In that equation, $f_i$ represents the frequency component in each of output signals 16 and 18 due to inertial rotation of sensor 10. The variable $f_d$ represents the frequency component in each of output signals 16 and 18 due to the dithering of sensor 10. Both the frequency of the component due to the dithering of sensor 10 and the frequency of the inertial rotation of sensor 10 are time varying quantities. The substantially sinusoidal signal by $s_2$ can be represented for modeling purposes by the following equation:

Equation No. 2:

$$s_2 = \sin 2\pi(f_i + f_d)t$$

where $f_i$ and $f_d$, as in equation 1, represent the frequency components in output signals 16 and 18 due to inertial rotation and dithering, respectively. Equation 2 represents signal $s_2$ when sensor 10 is rotated in a positive direction where the positive direction is defined as a direction of rotation of sensor 10 such that signal $s_1$ leads signal $s_2$ by 90°. If sensor 10 is rotated in a negative direction, the model of signal $s_1$ is unchanged and signal $s_2$ can be represented for modeling purposes by the following equation:

Equation No. 3:

$$s_2 = \sin 2\pi(f_i + f_d)t$$

where $f_i$ and $f_d$, as in equation 1, represent the frequency component in each of output signals 16 and 18 due to inertial rotation and the frequency component due to dithering, respectively. The negative rotation direction is that direction in which sensor 10 is rotated so that signal $s_1$ lags signal $s_2$ by 90°. The direction of sensor 10 rotation thus produces a relative phase shift between signals $s_1$ and $s_2$ which changes algebraic sign with rotation direction changes. Although, as shown in equations 1 through 3, sensor 10 direction has been simplified by treating signal $s_1$ as maintaining the same phase and signal $s_2$ shifting in phase. In actuality, both $s_1$ and $s_2$ change phase during sensor 10 rotation by 45° to produce a 90° phase difference between $s_1$ and $s_2$ for both positive and negative sensor 10 rotation.

The photodetector output signals 16 and 18 are provided to threshold circuits, 24 and 26, respectively. These threshold circuits 24 and 26 each receive the corresponding alternating polarity sinusoidal signal, and each provides a discrete output signal having a frequency and phase relationship corresponding to the photodetector output signals 16 and 18, respectively. More specifically, these threshold circuits 24 and 26 provide an output signal corresponding to a "logic 1" when the input signal is above a threshold level, and an output signal corresponding to a "logic 0" when the input signal is below a threshold value. In one preferred embodiment, threshold circuits 24 and 26 are zero crossing detectors. Threshold circuit 24 provides an output signal to a mixer, 28, while threshold circuit 26 provides an output signal to mixer, 30.

The output signals from threshold circuits 24 and 26 are a series of pulses. These pulses are representative of increments of the sensor 10 angular rotation. Therefore, these pulses are relatively close together when the sensor angular rate is large and are relatively far apart when the sensor angular rate is small. This pulse spacing is inversely related to the frequency of the sinusoidal signals $s_1$ and $s_2$ provided by the optical detector. Therefore, as the frequency of the sinusoidal signals $s_1$ and $s_2$ increases, the pulse spacing decreases. Conversely, as the frequency of the sinusoidal signals $s_1$ and $s_2$ decreases, the pulse spacing increases.

The dither bias or mechanical oscillation that is applied to sensor 10 causes the sinusoidal signals $s_1$ and $s_2$ to increase in frequency representing sensor 10 during rotation in one direction. This dither bias causes these sinusoidal signals $s_1$ and $s_2$ to then decrease in frequency from a relatively large frequency value for rotation in that direction to near zero (assuming no inertial component present), and to thereafter again increase to a relatively large frequency value representing the motion of sensor 10 in an opposite direction, etc.. Any inertial angular rotation of sensor 10 is effectively added to or subtracted from that frequency resulting from the dither bias, or mechanical oscillation, depending on the relative directions of rotation. For example, clockwise inertial angular rotation is effectively added to clockwise mechanical oscillatory motion portions thereby producing sinusoidal signals $s_1$ and $s_2$ having a frequency greater than the frequency produced by the dither bias or mechanical oscillatory motion alone for such portions of the dither oscillation. Conversely, counterclockwise inertial angular rotation is effectively subtracted from clockwise mechanical oscillatory motion portions of the oscillation cycles.

Mixers 28 and 30 are each provided with two discrete signals, an input signal and a carrier signal, which are mixed or multiplied together to produce a discrete mixer output signal. The mixers 28 and 30 provide an output signal that in essence has the form of a well known double sideband suppressed carrier signal. The mixer output signal includes an upper sideband frequency component and a lower sideband frequency component for the frequency translated components of the detector signals. The upper sideband frequency component with respect to the fundamental of the carrier frequency has a frequency based on the sum of the input frequency and the carrier frequency, and the corresponding lower sideband frequency component has a frequency based on the difference between the carrier frequency and the input signal frequency. The mixer output signal does not contain substantially any frequency components at either the input signal frequency or the carrier frequency.

The mixer output signals include the product of each individual frequency present in the input signal and each individual frequency present in the carrier signal. Because the mixer input signal and carrier signal are digital or square wave signals that are made up of a fundamental frequency and a series of odd harmonic frequencies, the resultant mixer output signal will contain virtually an infinite number of frequencies. The frequency of interest, however, is the product of the fundamental frequencies. The frequency components that are products of the odd harmonic frequencies are reduced in amplitude by a factor of the harmonic number. Therefore, the frequency component having an amplitude nearest to the amplitude of the product of the fundamental frequencies is the product of the fundamental frequency and the third harmonic component. This component has an amplitude that is one third of the amplitude of the product of the fundamental frequency components and has a frequency that is three times greater than the product of the fundamental frequencies. Because a phase lock loop, as will be discussed later, receives the mixer output signal and is capable of locking only to one of the sidebands formed by the fundamental frequencies, these frequency components that are products of harmonic frequencies can be ignored.

Mixer 28 has as its input signal the output signal from threshold circuit 24 and has as its carrier signal a signal designated as $R_1$ which is an output signal from a divide by four counter, 32. Mixer 30 has as its input signal the output signal from threshold circuit 26 and has as its carrier signal a signal designated $R_2$ which is an output signal from the divide by four counter 32. The generation of carrier signals $R_1$ and $R_2$ will be described later. However, the form of these carrier signals is relevant to the mixer outputs and therefore is described here. The carrier input signal $R_1$ provided to mixer 28, even though a discrete signal, can be represented for modeling purposes by the following equation:

Equation No. 4:

$$R_2 = 2\sin 2\pi(f_r - f_d)t$$

In equation 4, $f_d$ represents the dither frequency component, as described in equation 1, and $f_r$ represents a reference frequency provided by a reference frequency generator (not shown).

The carrier input signal $R_2$ provided to mixer 30, even though a discrete signal also, can be represented for modeling purposes by the following equation:

Equation No. 5:

$$R_2 = 2\cos 2\pi(f_r - f_d)t$$

For modeling purposes, it is assumed that the inputs to mixers 28 and 30 have the form of continuous signals instead of discrete signals. This assumption is useful for simplifying the presenting and keeping track of the fundamental frequencies occurring in the circuit. However, the preferred implementation makes use of digital circuits for the mixers 28 and 30 and the subsequent phase detectors. Digital circuits may be used in these applications to simplify the implementation thereof because, as discussed earlier, the only frequencies of interest are the fundamental frequencies. The information in these fundamental frequency signals are contained in the phase or zero crossings rather than in the signal amplitudes. The digital mixer may be implemented by using a two-input exclusive OR gate with one of these inputs used as the signal input and the other input used as the carrier input.

The output signals provided by mixers 28 and are designated as "$u_1$" and "$u_2$," respectively. The signal $u_1$, even though a discrete signal, can be represented for modeling purposes by the following equation:

Equation No. 6:
$$u_1 = \sin 2\pi(f_r + f_i)t + \sin 2\pi(f_r - f_i = 2f_d)t$$

In equation 6, the term $\sin 2\pi(f_r+f_i)$ represents the upper sideband frequency and the term $\sin 2\pi(f_r - f_i - 2f_d)$ represents the lower sideband frequency contained in the discrete signals provided by mixer 28.

The signal provided by mixer 30, $u_2$, for positive sensor rotation can be represented for modeling purposes by the following equation, even though a discrete signal:

Equation No. 7:

$$u_2 = \sin 2\pi(f_r + f_i)t + \sin 2\pi(f_r - f_i 2f_d)t$$

Equation 7 represents the product of $s_2$ shown in equation 2 and $R_2$ shown in equation 5, and where trigonometric identity $\sin A \cos B = \frac{1}{2}[\sin(A+B)+\sin(A-B)]$ is used to simplify and allow for combining terms.

The signal provided by mixer 30, $u_2$, for negative rotation, can similarly be represented for modeling purposes by the following equation:

Equation No, 8:

$$u_2 = \sin 2\pi(f_r + f_i)t - \sin 2\pi(f_r - f_i = 2f_d)t$$

Equation 8 represents the product of $s_2$ shown in equation 3 and $R_2$ shown in equation 5, and with the trigonometric identity $\sin A \cos B = \frac{1}{2}[\sin(A+B)+\sin(A-B)]$ for simplifying the terms.

In equations 7 and 8, the term $\sin 2\pi(f_r+f_i)$ represents the upper sideband frequency, and the term $\sin 2\pi(f_r - f_i - 2f_d)$ represents the lower sideband frequency component contained in the discrete signals provided by mixer 30.

As stated above, sinusoidal signals $s_1$ and $s_2$ are converted to digital pulse strings by threshold circuits 24 and 26, respectively. These digital pulse strings produced by threshold circuits 24 and 26 are provided to the input signal terminals of mixers 28 and 30, respectively. The frequency of occurrence of the pulses in this pulse string is representative of the sum of the frequency produced by the sensor inertial input and the frequency $f_d$ produced by the mechanical oscillation or dither input signal. The carrier frequency signal that is provided to mixers 28 and 30 is a signal that represents the reference frequency $f_r$ supplied by the reference signal generator reduced in value by the frequency of the mechanical oscillation or dither bias frequency $f_d$. The output signals from mixers 28 and 30, designated "$u_1$" and "$u_2$," respectively, each represent essentially a double sideband suppressed carrier signal. The upper sideband about the fundamental frequency of the carrier signal represents the sum of the reference frequency $f_r$ and the frequency $f_i$ due to the inertial input. The corresponding lower sideband represents the reference frequency $f_r$ reduced by or subtracted by the frequency resulting from the inertial input $f_i$ and twice the frequency resulting from the mechanical oscillation or dither bias $f_d$.

The carrier frequency, or reference frequency $f_r$ minus the frequency generated by the mechanical oscillation $f_d$, varies in frequency above and below the reference frequency $f_r$. For example, when the mechanical oscillation results in a clockwise rotation of the sensor 10, the carrier frequency will be less than the reference frequency $f_r$. Similarly, when the mechanical oscillation results in a counterclockwise rotation of the sensor 10, the frequency generated $f_d$ will effectively add to the reference frequency $f_r$ producing a carrier frequency that is greater than $f_r$. The upper sideband signal varies in frequency above and below the reference frequency $f_r$ depending on the direction of the inertial angular input to the sensor 10. Similarly, the lower sideband varies in frequency above and below the reference frequency $f_r$ depending on the direction of both the mechanical oscillation and the inertial angular input to the sensor 10.

As previously described, the sinusoidal signals $s_1$ and $s_2$ contain a frequency that is representative of the angular motion of sensor 10 as a result of both rotational oscillation and any inertial input to the sensor 10. In addition, associated with this frequency is a direction of rotation, i.e. clockwise or counterclockwise. The mixers 28 and 30 effectively provide a bias frequency to which frequencies due to rotation in one direction are added, and from which frequencies in the opposite direction are subtracted. In this manner, sensor 10 rotation is implicit in the mixer output signals $s_1$ and $s_2$.

The reference frequency $f_r$ is selected such that it represents a frequency that is greater than twice the frequency of the mechanical oscillation $f_d$ plus the maximum inertial input frequency $f_i$. With this value of reference frequency $f_r$, the lower sideband frequency will always be greater than zero.

Therefore, mixers 28 and 30 provide both an upper sideband signal and a lower sideband signal each of which contains the frequency $f_i$ that is directly related to the inertial input to sensor 10. In addition, these sideband signals are transformed, or shifted, in frequency by an amount equal to the reference frequency $f_r$ such that the lower sideband is always greater than zero. Finally, both the upper sideband and the lower sideband produced by each of mixers 28 and 30 contain the sum and difference frequencies but substantially none of the mechanical oscillation frequency $f_d$. In this manner, the mechanical oscillation frequency $f_d$ is separated from the inertial input frequency $f_i$. This is important because it is one of the objects of the present invention to produce a system output signal that is free from the effects of mechanical oscillation. As will be described below, the output of mixers 28 and 30 is provided to a phase lock loop. The phase lock loop is capable of locking or tracking only relatively low rate of change signals. Therefore, the phase lock loop is capable of tracking or locking on the upper sideband that does not contain the oscillation frequency $f_d$. In addition, the phase lock loop is capable of tracking at least the input signal $f_i$ in the lower sideband because this portion has a low rate of change relative to the oscillation frequency component $2f_d$. In this manner, the oscillation frequency $f_d$ does not contribute to the phase error signal within the phase lock loop and therefore does not appear in the system output, as will be described later.

Mixers 28 and 30 provide input signals $u_1$ and $u_2$, respectively, to a phase lock loop circuit that includes phase detectors, 34 and 36, a summing means, 38, an integrator, 40, a voltage controlled oscillator, 42, a counter, 44, a multiplexer, 46, and a latch, 48. Phase detectors 34 and 36 provide output signals designated as $e_1$ and $e_2$, respectively.

The phase lock loop circuit receives each of the single polarity rectangular wave signals $u_1$ and $u_2$. Each signal $u_1$ and $u_2$ has a phase designated as "$\Phi_1$" and "$\Phi_2$," respectively, associated therewith. These phases $\Phi_1$ and $\Phi_2$ represent the phases of photodetector output signals $s_1$ and $s_2$, respectively, relative to an arbitrary starting time. Therefore, $\Phi_1$ and $\Phi_2$ represent an accumulated phase from this arbitrary start time. Both the threshold circuits 24 and 26 and the mixer 28 and 30 do not alter these phases which are provided to the phase lock loop. The phase lock loop circuit produces an enhanced sensor output signal from each stage of binary counter 44 that is stored in latch 48. The phase lock loop feedback signal, as will be discussed in more detail later, is a square wave signal from a single stage or bit of counter 44 having a phase designated as "$\Phi_c$." Phase detectors 34 and 36 provide discrete output signals $e_1$ and $e_2$, respectively, that are determined by the phase deviation between the phase lock loop input signal and the phase lock loop feedback signal. Phase detector 34 produces output signal $e_1$ that is representative of the phase deviation between the signal $u_1$ having phase $\Phi_1$ and a discrete signal produced by a selected bit position at the output of the binary counter 44 having phase $\Phi_c$ referred to as the phase lock loop feedback signal. Phase detector 36 produces output signal $e_2$ representing the phase deviation between the signal $u_2$ having phase $\Phi_2$ and the phase lock loop feedback signal. A simple digital phase detector can be represented as a two input exclusive OR gate. Phase detectors 34 and 36 each provide outputs $e_1$ and $e_2$, respectively, that are combined together by signal combining means 38. Signal combining means 38 is essentially a discrete frequency summing circuit for adding the phase detector signal $e_1$ with the phase detector signal $e_2$ to produce a resultant output voltage signal $e_e$ supplied to integrator 40.

The discrete phase lock loop feedback signal produced from a selected bit of binary counter 44 is a sinusoidal signal having a frequency that is equal to the sum of the reference frequency $f_r$ and the inertial input frequency $f_i$. The phase detectors 34 and 36 act as a discrete frequency multiplier producing output signals $e_1$ and $e_2$, respectively. Output signal $e_1$ can be represented by the product of signal $u_1$ and the phase lock loop feedback signal. Similarly, output signal $e_2$ is the product of signal $u_2$ and the phase lock loop feedback signal. The product of discrete signals represented by square wave signals is known and discussed previously with respect to mixers 28 and 30. As will be discussed below, output signals $e_1$ and $e_2$ are low pass filtered and therefore are represented by an average value in Table I.

Integrator 40 provides an integrator output signal that is the integral of the integrator input signal. Integrator 40 has a frequency response of $1/f$, therefore the lower the frequency of the integrator input signal the higher the gain will be for the integrator output signal. In this manner, the integrator 40 acts as a low pass filter and therefore the output signals $e_1$ and $e_2$ from phase detectors 34 and 36, respectively, in Table I are represented by time average values or low pass filtered values. Therefore, output signals $e_1$ and $e_2$ are represented by $\overline{e_1}$ and $\overline{e_2}$ in Table I as the lowpass filtered or average value of the outputs of the phase detectors 35 and 36 after passing through integrator 40, respectively.

TABLE I (I). POSITIVE SENSOR ROTATION
LOWER SIDEBAND $$e_1 = -\sin\Phi \sin^2 2\pi(f_r - f_i - 2f_d)t = \frac{\sin\Phi}{2}$$
$$e_2 = \sin\Phi \sin^2 2\pi(f_r - f_i - 2f_d)t = -\frac{\sin\Phi}{2}$$
$$\overline{e_e} = 0$$

UPPER SIDEBAND $$e_1 = -\sin\Phi \sin^2 2\pi(f_r + f_i)t = -\frac{\sin\Phi}{2}$$
$$e_2 = -\sin\Phi \sin^2 2\pi(f_r + f_i)t = -\frac{\sin\Phi}{2}$$
$$\overline{e_e} = -\sin\Phi$$

(II). NEGATIVE SENSOR ROTATION
LOWER SIDEBAND $$e_1 = -\sin\Phi \sin^2 2\pi(f_r - f_i - 2f_d)t = -\frac{\sin\Phi}{2}$$
$$e_2 = -\sin\Phi \sin^2 2\pi(f_r - f_i - 2fd)t = -\frac{\sin\Phi}{2}$$
$$\overline{e_e} = -\sin\Phi$$

UPPER SIDEBAND $$e_1 = -\sin\Phi \sin^2 2\pi(f_r + f_i)t = -\frac{\sin\Phi}{2}$$
$$e_2 = \sin\Phi \sin^2 2\pi(f_r + f_i)t = \frac{\sin\Phi}{2}$$
$$\overline{e_e} = 0$$

Shown in Table I are equations representing the average value of phase detector outputs $e_1$ and $e_2$ for both the upper sideband frequency components and the lower sideband frequency components for both positive and negative sensor rotation directions. Also shown in Table I are equations representing the output of signal combining means 38 represented by the term $e_e$ for both the upper and lower sidebands for positive sensor rotation and for negative sensor rotation. The output of signal combining means 38 is a voltage that represents the combined phase error signal from phase detectors 34 and 36. In addition, the output $e_e$ of signal combining means 38 also represents the error or rebalance signal supplied to the phase lock loop. As shown in Table I, when the sensor is rotating in a positive direction and the phase lock loop is operating at the lower sideband frequency, signal combining means output $e_e$ is equal to zero. Similarly, if sensor rotation is in a negative direction and the phase lock loop is operating at an upper sideband frequency, the output of signal combining means output $e_e$ is also equal to zero. When the output of signal combining means 38 is equal to zero, the phase lock loop rebalance signal will be zero, and thus the phase lock loop is prevented from locking. The phase lock loop tends to lock-on or track the spectral components that are products of the fundamental components because these spectral components have greater amplitudes than the products of the harmonic components, as discussed previously. In addition, the spectral components resulting from the products of harmonic components tend to be either outside the tracking range or these components change too rapidly for the phase lock loop to track them.

For positive sensor rotation and when the phase lock loop is operating at the upper sideband frequency, the average value of the output of the signal combining means 38, $e_e$, will be equal to $-\sin\Phi$ where $$\Phi = \Phi_c - \frac{(\Phi_1 + \Phi_2)}{2}.$$

Similarly, if the sensor is rotated in a negative direction and the phase lock loop is operating at a lower sideband frequency then the average value of the signal combining means 38 output, $e_e$ will equal $-\sin\Phi$ where $$\Phi = \Phi_c - \frac{(\Phi_1 + \Phi_2)}{2}.$$

It is under these latter two operating conditions that a phase lock loop error or rebalance signal which is nominally proportional to the phase error is established. In this manner, the phase lock loop tends to lock on or track the upper sideband for positive sensor rotations and the lower sideband for negative sensor rotations.

The output of signal combining means 38, signal $e_e$ representing the phase error signal, is provided to integrator 40. Integrator 40 provides an output signal which is essentially an integration of the phase error represented by signal $e_e$ over time. The output signal of integrator 40 is provided to the input of voltage controlled oscillator 42. Voltage controlled oscillator 42 produces an output signal having a frequency that is dependent upon the input signal received from integrator 40. More specifically, voltage controlled oscillator 42 provides a rectangular wave logic level output signal having a frequency that is dependent upon the voltage magnitude of the output signal of integrator 40 provided to the input of voltage controlled oscillator 42.

The output of voltage controlled oscillator 42 is provided to the input of counter 44. The rectangular wave output signal frequency of voltage controlled oscillator 42 is forced to some multiple of the sum of the reference frequency $f_r$ and the input frequency $f_i$, which is represented mathematically by $n(f_r+f_i)$, by the phase detectors 34 and 36 output error signals because of the divider action of counter 44. Counter 44 is a counter having a number of stages. The number of stages in counter 44 produces a countdown ratio that is equal to n. This countdown ratio is accomplished by providing an output signal or phase lock loop feedback signal that is produced by a selected bit of binary counter 44. In this manner, the phase lock loop feedback signal is representative of the output signal of voltage controlled oscillator 42 divided by a factor of n. This countdown factor n corresponds to the factor n which the sum of the reference frequency $f_r$ and the input frequency $f_i$ is multiplied by when provided to counter 44. The contents of counter 44 are the system output signal which is a digital word that is representative of a high resolution version of the sensor 10 inertial angular input or input angle. The contents of counter 44 is clocked into latch 48 when a latch enable signal 49 is active to provide an enhanced or a highly resolved measure of the sensor 10 output signals which are representative of sensor 10 angular rotation or angular inputs.

The output of several stages of counter 44 are provided to multiplexer 46. A resolution select signal, 50, is provided to multiplexer 46 allowing any number of the counter stage outputs that are provided to multiplexer 46 to represent the phase lock loop feedback signal produced by a selected bit position of counter 44 that is provided to phase detectors 34 and 36. For example, sensor readout resolution improvements of eight times, 16 times, 32 times, or 64 times can be implemented by selecting the third, fourth, fifth or sixth stage of the binary counter using resolution select input 50 to multiplexer 46. The output of multiplexer 46 is the phase lock loop feedback signal that is representative of the sum of the reference frequency $f_r$ and the input frequency $f_i$.

The dynamic range of a signal is a ratio of its maximum value to its minimum value. The practical implementation of the phase lock loop requires that the dynamic range of the phase lock loop input signal is not excessive. Because the angular rate signals 16 and 18 from sensor 10 are dual polarity signals and therefore must pass through zero, the dynamic range for the angular rate signal provided by sensor 10 is infinite. Mixers 28 and 30 reduce the dynamic range significantly by transferring the sensor 10 output signal frequency to a new frequency range. The output signals $u_1$ and $u_2$ from mixers 28 and 30, respectively, contain the sum and difference frequencies but there are no frequencies at either the signal or carrier frequencies. In this manner, the sensor input angular rate signal no longer passes through zero and thus the dynamic range is no longer infinite.

In addition, the practical implementation of the phase lock loop requires that the voltage controlled oscillator 42 have a limited maximum frequency. Limiting the maximum frequency required of the voltage controlled oscillator forces a tradeoff between the dynamic range and the maximum frequency for the voltage controlled oscillator. For example, the reference frequency may be set at 2 megahertz (mHz) for an application where the sum of the inertial input frequency $f_i$ and the mechanical oscillation frequency $f_d$ is equal to 1 mHz. In this case, the lower sideband frequency provided by the multipliers 28 and 30 is based on the reference frequency $f_r$ of 2 mHz minus the sum of the input frequency $f_i$ and the mechanical oscillation frequency $f_d$, which is equal to 1 mHz, thereby producing a lower sideband having a frequency of 1 mHz. The upper sideband provided by mixers 28 and 30 is based on the sum of the reference frequency $f_r$, which equals 2 mHz, and the sum of the input frequency $f_i$ and mechanical oscillation frequency $f_d$, which is 1 mHz, thereby producing an upper sideband of 3 mHz. In this case, the voltage controlled oscillator 42 has a maximum frequency of 3 mHz times n, a minimum frequency of 1 mHz times n, and the dynamic range is 3:1.

A dither frequency generation loop provides an instantaneous frequency replica of the dither input signal based on the dither rate monitor signal 22 for canceling the dither frequency component present in sensor output signals 16 and 18. The dither generation loop includes a threshold circuit, 52, a demodulator, 54, an integrator, 56, a multiplier, 58, a signal combining means, 60, a voltage controlled oscillator, 62, and a counter, 32. The dither rate monitor signal 22 is a sinusoidal signal that is proportional to the dither angular rate. The dither rate monitor signal 22 is provided to threshold circuit 52 that provides a single polarity rectangular wave, or discrete, output signal having a phase and frequency corresponding to the dither rate monitor signal 22. The output of threshold circuit 52 is provided to demodulator 54.

In addition to receiving the rectangular wave dither rate monitor signal from threshold circuit 52, demodulator 54 is also provided the output signal from phase lock loop integrator 40. Demodulator 54 provides an output signal to integrator 56 that is representative of the amplitude of the dither frequency component that is present in the phase lock loop integrator 40 output. Demodulator 54 essentially acts as a synchronous demodulator that provides an output signal that is representative of the reference signal components at the dither frequency, represented by the output of threshold circuit 52, that are present in the signal input, represented by the output of phase lock loop integrator 40.

The output signal from demodulator 54 is provided to the integrator 56 which performs an integration function to filter noise, thereby providing a steady output signal to the analog multiplier 58. In addition, the analog multiplier 58 is provided the dither rate monitor signal 22. The multiplier 58 provides an output signal that is representative of the dither rate monitor signal 22 scaled by the signal provided by integrator 56. In other words, the output of multiplier 58 will be equal to the dither rate monitor signal 22 scaled by the amount of the dither frequency component present in the phase lock loop.

The output of multiplier 58 is provided to signal combining means 60. The signal combining means 60 also receives the output of integrator 66. These two signals supplied to signal combining means 60 are combined to form an output signal that is provided to voltage controlled oscillator 62. Signal combining means 60 is essentially a summing circuit for adding the signal provided by multiplying means 58 and the signal provided by integrator 66.

Voltage controlled oscillator 62 provides an output signal that has a frequency that is proportional to the signal provided to its input from the output of signal combining means 60. The output of voltage controlled oscillator 62 is a frequency four times higher than the difference between the reference frequency $f_r$ and the mechanical oscillation frequency or dither frequency $f_d$, and is provided to counter 32. Counter 32 performs essentially a divide by four function, thus providing an output having a frequency one-fourth that of the input frequency provided by voltage controlled oscillator 62. Counter 32 provides a discrete output signal, designated as "$R_1$" in FIG. 1, that is in phase with the input signal and is supplied to the reference input of mixer 28. In addition, counter 32 provides a discrete quadrature signal, designated as "$R_2$" in FIG. 1, that is 90° out of phase with the input signal and is provided to the reference input of mixer 30. The in-phase output, $R_1$, of counter 32, even though a discrete signal, can be represented by the term $2\sin 2\pi(f_r-f_d)t$, as indicated above, while the quadrature output $R_2$ of counter 32, also a discrete signal, can be represented by the term $2\cos 2\pi(f_r-f_d)t$, also given above. Both signals $R_1$ and $R_2$ are modeled as continuous signals because we are only interested in the product of the fundamental components produced by mixers 28 and 30. Therefore, it is more convenient to model signals $R_1$ and $R_2$ as continuous signals rather than as a series of square wave signals.

Also shown in FIG. 1 is a hulling loop that includes a counter, 68, a latch, 70, a digital-to-analog converter, 72, and previously mentioned integrator 66, signal combining means 60, voltage controlled oscillator 62 and counter 32. Counter 68 is an up-down binary counter. The quadrature output of counter 32 is provided to the up input of counter 68 and a reference frequency designated as $f_r$ is provided to the down input of counter 68 by the reference frequency generator (not shown). The contents of counter 68 are incremented by a logic level transition at the up input of counter 68. Conversely, the contents of counter 68 are decremented by a logic level transition at the down input of counter 68. The contents of counter 68 are stored or clocked into latch 70 each time a latch enable signal 71 provided by threshold circuit 52 becomes active. The count stored in latch 70 is provided to digital-to-analog converter 72. The digital-to-analog converter 72 provides an analog output signal that is representative of the digital value received from latch 70. Digital-to-analog converter 72 provides an analog signal representative of the digital value in latch 70 to integrator 66 that provides an output signal that is the integral of the input signal and provides this to signal combining means 60.

Counter 68 is enabled for an integral number of mechanical oscillation periods thereby producing an output count that is representative of the dither bias frequency $f_d$ with the reference frequency component $f_r$ being cancelled by the down counts. The latch 70 samples or clocks in the contents of the up-down counter 68 exactly one period of mechanical oscillation apart, therefore any difference in count will represent a bias or offset in the dither frequency $f_d$ in the output of voltage controlled oscillator 62. This offset or residual is provided to digital-to-analog converter 72 and integrator 66, and ultimately to signal combining means 60 to remove this offset in the frequency of the voltage controlled oscillator 62 output signal. The residual, or bias, in the output of the voltage controlled oscillator 62 is produced because the counter 68 is sampled by latch 70 at positive zero crossings of the dither rate monitor signal 22. Since the contents of the counter 68 is the integral of the dither rate monitor signal 22, the contents of the counter will be some negative value when the dither rate monitor signal 22 is at a positive zero crossing causing an error signal producing bias to be eventually added to the counter 68.

The output of counter 68 that is sampled by latch 70 will be zero when the dither frequency has no residual. The output of counter 68 that is sampled by latch 70 has either a negative count or a positive count when the dither frequency has some residual value. The nulling loop cancels out this residual value by applying a bias to signal combining means 60.

In operation, photodetector output signals 16 and 18 are provided to mixers 30 and 28, respectively. These photodetector output signals 16 and 18 are mixed with the in phase signal $R_1$ and quadrature signal $R_2$ from counter 32 of the dither stripping loop. The counter in phase signal $R_1$ and quadrature signal $R_2$ contains the difference between the reference frequency $f_r$ and the dither frequency $f_d$. The output signal from mixers 28 and 30 has signal components that are either devoid of the dither frequency component $f_d$, or the dither frequency component $f_d$ is doubled in frequency so that the phase lock loop is not able to track this high frequency component.

The phase lock loop will tend to track the output signals from mixers 28 and 30, $u_1$ and $u_2$, respectively, so long as these signals are within the tracking frequency range of the phase locked loop and a phase rebalance force is provided to integrator 40. The phase rebalance force is proportional to the phase error or the difference between the phase lock loop feedback signal and the phase detector inputs. Because this phase error is related to the inertial input angle to sensor 10, this rebalance force or voltage applied to the voltage controlled oscillator 42 is related to the input angle to sensor 10. The output of the voltage controlled oscillator is a frequency that is representative of the inertial angular rate input to sensor 10. The output frequency of the phase locked loop is a multiple of the sum of the input frequency fi and the reference frequency $f_r$ which, when provided to a multistage counter, provides a highly resolved measure of the input frequency $f_i$. Changes in the input frequency $f_i$ are representative of changes in the sensor angular rate and therefore the counter output represents a highly resolved, or amplified, measure of the sensor input angle.

The dither stripping loop insures that the dither frequency component provided to mixers 28 and 30 is representative of the dither frequency component in the phase lock loop. In addition, the nulling loop insures that the dither frequency component provided to mixers 28 and 30 does not have a bias and thus has an average value equal to zero.

The contents of counter 44 are periodically sampled by latch 48. The contents of latch 48, which represents the enhanced sensor input angle plus the accumulated reference frequency $f_i$, is then provided to a digital computer (not shown). The actual enhanced sensor input angle is determined in the digital computer by subtracting the known accumulated reference frequency $f_r$ from the contents of the latch 48.

In one preferred embodiment, the reference frequency is a multiple of the rate in which latch 48 samples counter 44. With this arrangement, the reference frequency is represented by one or more bits in the output of counter 44 which may be simply masked or subtracted from the output of counter 44. This allows for faster subtraction of the reference frequency $f_r$ from the count representing the output of counter 44.

The present invention is capable of receiving a signal from an angular rate sensor indicative of incremental angular changes and providing an output signal that provides a highly resolved measure of these angular increments. In one preferred embodiment, the highly resolved angular increments are 128 times greater resolution than the signal provided by the angular rate sensor. Dithered angular rate sensors provide an output signal that not only includes an incremental angular rate component, but also includes the dither component due to dithering. The present invention, when provided with the sensor output signal from a dithered angular rate sensor, provides an output signal that has a greater incremental angular resolution and which substantially excludes those components in the angular rate output signal due to dithering.

Although the present invention has been described with reference to preferred embodiments, workers skilled in the art will recognize that changes may be made in form and detail without departing from the spirit and scope of the invention.

What is claimed is:

1. An angular rotation sensing system for sensing rotational motion, said angular rotation sensing system providing a sensing system output signal, indicative of high resolution increments of angular rotation, said angular rotation sensing system comprising:

an angular motion sensor for providing an angular motion sensor signal having an inertial component due to any system rotation input angle and an oscillation component due to rotational oscillation of said angular motion sensor sensed by said angular motion sensor;

mixer means for receiving a mixer means input signal representative of both said inertial component and said oscillation component and a reference signal, said mixer means providing a mixer means output signal that is representative of said mixer means input signal modulated with said reference signal; and synchronous oscillator means for producing a control signal phase synchronized with said mixer means output signal, said synchronous oscillator means also for providing said system output signal based on said control signal.

2. The angular rotation sensing system of claim 1 wherein said reference signal includes a frequency component that is representative of said oscillation component.

3. The angular rotation sensing system of claim 1 wherein said mixer means output signal includes an upper frequency component representative of a sum of said reference signal frequency and an angular motion sensor signal frequency, and a lower frequency component representative of a difference between said reference signal frequency and said angular motion sensor signal frequency, and wherein said synchronous oscillator means includes a selection means for selectively phase synchronizing to one of said upper frequency component and said lower frequency component, depending on rotation direction of said angular motion sensor.

4. The angular rotation sensing system of claim 3 wherein said reference frequency signal includes a frequency component that is representative of said oscillation component and a frequency component that is provided by a constant frequency source.

5. The angular rotation sensing system of claim 1 and further including:
  oscillation component monitor means for providing an oscillation signal related to said oscillation component:
  scaling means for providing a scaled oscillation signal representative of said oscillation component amplitude based on said oscillation signal; and
  offset compensating means for compensating said scaled oscillation signal to provide said reference signal having a time average value that is substantially zero.

6. The angular rotation sensing system of claim 1 wherein said angular motion sensor signal includes a first angular motion sensor signal component and a second angular motion sensor signal component, and wherein said mixer means includes a first mixer for receiving said first angular motion sensor component signal and a first reference signal, the first mixer providing a first mixer output signal that is representative of said first angular motion sensor component signal modulated by said first reference signal; and a second mixer for receiving said second angular motion sensor component signal and a second reference signal, said second mixer providing a second mixer output signal that is representative of said second angular motion sensor component signal modulated with said second reference signal.

7. The angular rotation sensing system of claim wherein said synchronous oscillator means includes:
  first phase detection means for providing a first phase detector output signal representative of phase differences between said first mixer output signal phase and said sensing system output signal phase;
  second phase detection means for providing a second phase detector output signal representative of phase differences between said second mixer output signal phase and said sensing system output signal phase;
  signal combining means for combining said first phase detector output signal and said second phase detector output signal thereby providing a signal combining means output signal that is related to a phase difference between said sensing system output signal phase and each of said first mixer output signal phase and said second output signal phase;
  oscillator means for providing an oscillator output signal based on said signal combining means output signal; and
  counter means for receiving said oscillator output signal and providing said sensing system output signal based on said oscillator output signal frequency.

8. The angular rotation sensing system of claim 7 wherein said integrator output signal is a voltage that is substantially equal to zero for one of said upper frequency component and said lower frequency component thereby allowing said synchronous oscillator means to selectively phase synchronize with said mixer means output signal.

9. The angular rotation sensing system of claim
  wherein said synchronous oscillator means includes:
  first phase detection means for providing a first phase detector output signal representative of phase differences between said first mixer output signal phase and said sensing system output signal phase;
  second phase detection means for providing a second phase detector output signal representative of phase differences between said second mixer output signal phase and said sensing system output signal phase;
  signal combining means for combining said first phase detector output signal and said second phase detector output signal thereby providing a signal combining means output signal;
  integrator means for performing an integration function on said signal combining means output signal to provide an integrator output signal;
  oscillator means for providing an oscillator output signal based on said integrator output signal; and
  counter means for receiving said oscillator output signal and providing said sensing system output signal based on said oscillator output signal frequency.

10. The angular rotation sensing system of claim wherein said integrator is capable of providing a said integrator output signal that is a voltage proportional to an angular rate of any input angle sensed by said angular motion sensor.

11. The angular rotation sensing system of claim 9 wherein said integrator is capable of providing a said integrator output signal that is a voltage related to a phase difference between said sensing system output signal phase and an average of said first mixer output signal phase and said second mixer output signal phase.

12. The angular rotation sensing system of claim 9 wherein said integrator means provides said integrator output signal that is related to relatively low frequency components of said signal combining means output signal based on said inertial component, and is substantially not related to relatively high frequency components of said signal combining means output signal based on said oscillation component.

13. The angular rotation sensing system of claim 1 wherein said angular motion sensor is a mechanically biased ring laser gyroscope, said ring laser gyroscope providing a photodetector output signal that includes an inertial component and an oscillation component.

14. The angular rotation sensing system of claim 1 wherein said synchronous oscillator means further includes:
  a voltage controlled oscillator for providing an oscillator output signal having a frequency related to said mixer means output signal phase; and
  a counter for providing said sensing system output signal based on said oscillator output signal frequency.

15. An angular rotation sensing system for sensing rotational motion, said angular rotation sensing system providing a sensing system output signal indicative of high resolution increments of angular rotation, said angular rotation sensing system comprising:
  an angular motion sensor for providing an angular motion sensor signal having an inertial component due to any input angle sensed by said angular motion sensor and an oscillation component due to rotational oscillation of said angular motion sensor, said angular motion sensor providing a monitor signal that is related to said oscillation component;
  signal combining means for receiving said angular motion sensor signal and a signal representative of said oscillation component, said signal combining means providing a signal combining means output signal having an inertial component with said oscillation component being substantially absent;

synchronous oscillator means for receiving said signal combining means output signal and providing an oscillator output signal that is selectively phase synchronized with said signal combining means output signal;

signal generation means for providing said signal representative of said oscillation component to said signal combining means, said signal representative of said oscillation component being based on said monitor signal; and counter means for receiving said oscillator output signal and providing said sensing system output signal based on said oscillator output signal frequency.

16. The angular rotation sensing system of claim 15 wherein said signal combining means is a mixer, said mixer receives said angular motion sensor signal and a reference signal and provides said signal combining means output signal that is representative of said angular motion sensor signal modulated with said reference signal.

17. The angular rotation sensing system of claim 15 wherein said synchronous oscillation means includes:
phase detection means for providing a phase detection output signal representative of phase differences between said signal combining means output signal phase and said sensing system output signal phase;

integrator means for forming an integration function on said phase detector output signal to provide an integrator output signal; and oscillator means for providing said oscillator output signal based on said integrator output signal.

18. An angular rotation sensing system for sensing rotational motion about a primary axis, said angular rotation sensing system being capable of providing a sensing system output signal representing an enhanced measure of angular rotation about said primary axis, said angular rotation sensing system comprising:

an angular motion sensor capable of providing an angular motion sensor signal indicative of angular rotation, the angular motion sensor signal having an inertial component due to rotation of said angular motion sensor about s&aid primary axis and an oscillation component due to rotational oscillation of said angular motion sensor;

translation means capable of receiving said angular motion sensor signal and a reference signal having a reference frequency, said translation means providing a translated output signal that is substantially the same as said angular motion sensor signal translated in frequency by an amount equal to said reference frequency;

phase detection means capable of receiving said translated output signal and a feedback signal, said phase detection means being capable of providing a detector output signal indicative of phase differences between said translated output signal and said feedback signal;

variable frequency means capable of receiving said detector output signal and providing a variable frequency output signal having an output signal frequency that is related to said detector output signal; and counter means capable of receiving said variable frequency output signal, said counter means being capable of providing said sensing system output signal based on said output signal frequency, said counter means being capable of providing said feedback signal that is related to said variable frequency output signal.

19. The angular rotation sensing system of claim 18 wherein said translation means is a mixer, said mixer receives said angular motion sensing system and said reference signal and provides a translated output signal that includes an upper frequency component representative of a sum of said reference signal frequency and said angular motion sensor signal frequency and a lower frequency component representative of a difference between said reference signal frequency and said angular motion sensor signal frequency.

20. The angular rotation sensing system of claim 18 wherein said variable frequency means is a voltage controlled oscillator, the voltage controlled oscillator receives said detector output signal voltage and provides a variable frequency output signal having a frequency related to said detector output signal voltage.

* * * * *